2,803,558
METHOD OF TREATING ADHESIVE GUMS

George D. Fronmuller, Mamaroneck, N. Y., assignor to Commonwealth Color & Chemical Co., New York, N. Y., a corporation of New York No Drawing. Application June 27, 1956, Serial No. 594,093

17 Claims. (Cl. 106—205)

The present invention is directed to the treatment of gum adhesives or mucilages and more particularly to those derived from locust bean and guar seeds.

Adhesives of this type, which have as their principal constituents manno-galactans, are derived from various sources such as the locust bean, guar, honey locust, *Sapora japonica,* palo verde, tara, flame tree (*Delonix regia*) and acacia. The use thereof in the paper industry has extended over a considerable period of time, the gums being generally introduced into the paper pulp in the beater for the purpose of acting as a binder to strengthen the paper. They accomplish the purpose of improving the formation of sheets, increasing Mullen, tensile and developing a wet strength. However, there are certain disadvantages inherent in the use of these gums in that the dispersions thereof are viscous, making them difficult to handle both in the preparation and in the use thereof.

The reason for this is that a dispersion of the gum, say, containing 0.5–1.5%, produces a semi-solid gel which is very difficult to handle in a paper mill system. It has been recognized that in order to make such gums suitable for handling, the gum must be treated or converted so as to reduce its viscosity. It has been proposed to treat the gum, suitably powdered and in the dry state, with heat and the presence of an anhydrous acid, namely, hydrochloric acid. The treatment was at a relatively high temperature, about 120° to 140° C. for a long time. While this treatment resulted in the desired reduction of viscosity, it had a number of disadvantages. Acid proof equipment was required. Some deposition took place and an undesirable color was imparted to the product. If the starting material contained a substantial amount of the seed coating, the adhesive properties of the product were injured. Also, the process required close supervision and control in order to reproduce the results.

There was also used as an adhesive a starch degenerated by treatment with acid. The operation was costly and certain unsatisfactory characteristics developed in the starch. Furthermore, the amount of starch necessary to give the desired results in the paper making process was relatively large so that it was quite expensive to use.

The present invention is intended and adapted to overcome the difficulties and disadvantages inherent in the prior art, it being among the objects of the present invention to provide a process of treatment of gums of the character described, which is simple, readily controlled and which results in a uniform product without any decomposition or discoloration.

It is also among the objects of the present invention to provide a process of reducing the viscosity of said gums, which results in a product which is more easily handled in the paper mills, is useful in connection with tub sizing operations, has improved retention of filler clays and is a satisfactory adhesive for coating colors on sheet material.

It is further among the objects of the present invention to provide a product which may be used in relatively small quantities in the paper making process and which is an excellent adhesive both for the paper fibers and materials incorporated in paper.

In practicing the present invention the gum in the dry subdivided state is treated at relatively low temperatures with a combined oxidizing agent and acid. The substance used is a solution of peracetic acid which is usually in aqueous solution to the extent of about 40%. Such a solution is quite stable and there is applied from .25%–10.0% of peracetic acid by weight of the gum. The mixture is treated at temperatures above room temperature but below the boiling point of water and generally within the limits of 35° to 90° C. The peracetic acid may be in solution in volatile organic solvents. Heating is continuous for a sufficient length of time to reduce the viscosity to the desired point, usually from ½ to 3 hours. After the reaction is complete the acid present is neutralized with an alkaline salt in an amount usually varying from 3% to 6% by weight of the gum.

It is desirable that after the application of the adhesive to the paper, it be rendered insoluble. Therefore, there is added to the composition formed as stated above, an amount of an insolubilizing agent of .5 to 2% by weight of the gum. In applying the adhesive to the fiber, an amount from .1 to .5% on the weight of the fiber has been found to be quite suitable.

The following are specific examples of the operation of the invention:

Example 1

A mixture is made as follows:

| | Parts by weight |
|---|---|
| Locust bean gum | 1000 |
| 40% peracetic acid | 100 |

The mixture in a suitable vessel is heated with stirring at a temperature of about 50° C. for one-half hour, during which period the desired reduction in viscosity of the gum takes place. Thereupon there is added about 4% by weight of sodium carbonate based on the gum to neutralize the free acid present. The gum so treated is dissolved in water to provide a .5% solution.

In order to indicate the speed and character of the reaction a test was made, the results of which are shown in the following table:

| Time, min.: | Viscosity, ½% soln., cps. |
|---|---|
| 0 | 99.0 |
| ½ hr | 2.02 |
| 1 | 1.99 |
| 1½ | 1.97 |
| 2 | 1.97 |
| 2½ | 1.97 |
| 3 | 1.97 |

This indicates clearly that within the first half hour of treatment substantially complete conversion has taken place and that further heating does not give any further appreciable conversion of the gum.

Example 2

The following composition is provided in a suitable reaction vessel:

| | Parts by weight |
|---|---|
| Guar gum | 1000 |
| 40% peracetic acid | 50 |
| Methyl alcohol | 50 |

The methyl alcohol is introduced into the solution of peracetic acid to form a homogeneous solution and the latter is incorporated in the gum with stirring.

The temperature is raised to about 60° C. and maintained for about one hour to cause the desired reduction in viscosity. Then the excess acid is neutralized with about 3% of disodium phosphate. The resulting product is dissolved in water to form a solution containing .5% of the converted gum.

*Example 3*

To the product of Example 1 is added 15 parts by weight of glyoxal. The latter material adds the property of causing the gum to become insoluble after it is applied to the paper.

*Example 4*

To the product of Example 2 is added 30 parts by weight of an aqueous solution of formaldehyde. The solution is the ordinary commercial material containing approximately 37% formaldehyde. It serves as an agent for causing the gum to become insoluble on the paper fiber.

The product of the present invention is easy to handle in the usual equipment of the paper mill, namely in the tanks, pumps and pipe lines. It has proven satisfactory in the color coating of papers. In conjunction with the introduction of fillers such as clays in paper, the product has given improved retention of the clays, more uniform dispersion thereof and better distribution in the paper. An amount of about 1% based on the weight of the filler has given excellent results as compared to the necessity for using from 4% to 8% of starch for similar effectiveness.

The following are specific examples of the application of the products of the present invention to practical uses in industrial operations:

*Example 5*

Clay suspensions are used for loading paper. The clay, together with other substances normally used for the purpose, is dispersed in a sufficient amount of water to give the desired viscosity with the addition of a suitable dispersing agent. An amount of the product of Example 1 equal to about 1% based on the weight of the clay is added slowly to the clay slurry or dispersion with constant stirring. The composition so formed is then applied to a paper pulp system in an amount of about 5% of clay on the weight of the paper, in the usual manner.

The clay is deposited in the paper substantially uniformly throughout the thickness of the paper. This tends to eliminate two-sidedness of the paper and improve the printability of the finished sheet because the clay is uniformly dispersed throughout the mass of fiber. The retension of the clay is in the neighborhood of 65% as compared with a clay retention of 30% obtained in a control composition of the same character.

*Example 6*

The products of the present invention are suitable for use as an adhesive in pigment coating materials for paper or other materials to be given a surface coating.

There is provided a solid material in finely divided state which is to form the color coating composition. It is in a suspension containing about 50% of solids. There is incorporated therein from 2 to 2.5 lbs. per 100 lbs. of coating composition, namely, from 4% to 5% based on the weight of the solids present. An effective and satisfactory coating is formed with such a composition.

In the prior art in order to obtain similar results when converted starch was used as the adhesive, it required from 8 to 9 lbs. per 100 lbs. of coating composition, and when casein or alpha protein is used, from 5 to 6 lbs. per 100 lbs. of coating composition is required. Therefore, 5% or less of the present product is as effective as 16 to 18% of the converted starch and 10% to 12% of the casein.

The present products are compatible with both starch and casein and can be used in conjunction with such products without any alteration in the technique of the coating operation. Furthermore, it is not necessary to cook the present products prior to the addition thereof to the clay slurry, since the results obtained with the uncooked product are identical with those obtained with the cooked product.

*Example 7*

The products of the present invention may be used as a tub size in place of converted starches, which are commonly used for sizing materials applied to paper and textiles.

When converted starch is used, about 12% thereof based on the amount of fiber to be treated is used. There is substituted for the starch, 1% of the product of the present invention and the technique of the operation is unchanged. It has been found that 1% of the present product is as effective as 12% of the prior art starch.

The use of the present products results in the laying of the surface fiber, giving the sheet a smoother appearance. It improves the erasure of the finished sheet and also develops some Mullen and tensile characteristics. The application of the present products produces a sheet having a higher Mullen than is obtained by the use of starch, while at the same time the tear will not be adversely affected.

Although the invention has been described setting forth a number of specific examples of the operation and the use of the product, such examples are intended to illustrate the invention and not to limit it. It is apparent to those skilled in the art that various changes in the details of the operations may be made within the principles herein set forth. In place of glyoxal or formaldehyde there may be used magnesium metaborate in small amounts, say, about 1 to 5%, on the weight of the gum, to insolubilize it and give plasticity to the sheet. Other uses than those described herein may be made. For instance, the present products may be used in the textile industry in connection with sizing or printing operations and in fact, wherever an efficient adhesive is required. The present products may also be used in the food industry, such as in conjunction with gelling agents for food products.

These and other changes in the details may be made within the spirit of the invention, which is to be broadly construed and not to be limited except by the character of the claims appended hereto.

By the term "alkaline salt" it is intended to include such soluble salts of the alkali metals which do not oxidize or reduce the gum and which are capable of neutralizing the excess acid in the reaction products to form soluble salts. They include the carbonates, bicarbonates, orthophosphates, meta-phosphates, pyro-phosphates, tri-phosphates, tetra-phosphates, double phosphates and borates of sodium, potassium, lithium and ammonium.

I claim:

1. A method of treating adhesive gums containing principally manno-galactans which comprises adding to the substantially dry gum peracetic acid, heating the mixture so obtained to a temperature substantially above room temperature and below the boiling point of water, whereby the viscosity of said gum is reduced and the product is a substantially dry material, adding thereto an inorganic, non-oxidizing, alkaline reacting salt for neutralizing the acidity of said gum, and adding thereto a substance taken from the class consisting of glyoxal and formaldehyde in the liquid state.

2. A method of treating adhesive gums containing principally manno-galactans which comprises adding to the substantially dry gum peracetic acid, heating the mixture so obtained to a temperature substantially above room temperature and below the boiling point of water, whereby the viscosity of said gum is reduced and the product is a substantially dry material, and adding thereto an inorganic, non-oxidizing, alkaline reacting salt for neutralizing the acidity of said gum.

3. A method of treating adhesive gums containing principally manno-galactans which comprises adding to the substantially dry gum peracetic acid, heating the mixture so obtained to a temperature within the limits of 35° to 90° C., whereby the viscosity of said gum is reduced and the product is a substantially dry material, and adding thereto an inorganic, non-oxidizing, alkaline reacting salt for neutralizing the acidity of said gum.

4. A method of treating adhesive gums containing principally manno-galactans which comprises adding to the substantially dry gum an aqueous solution of peracetic acid, heating the mixture so obtained to a temperature substantially above room temperature and below the boiling point of water, whereby the viscosity of said gum is reduced and the product is a substantially dry material, and adding thereto an inorganic, non-oxidizing, alkaline reacting salt for neutralizing the acidity of said gum.

5. A method of treating adhesive gums containing principally manno-galactans which comprises adding to the substantially dry gum a solution in an inert volatile organic solvent of peracetic acid, heating the mixture so obtained to a temperature substantially above room temperature and below the boiling point of water, whereby the viscosity of said gum is reduced and the product is a substantially dry material, and adding thereto an inorganic, non-oxidizing, alkaline reacting salt for neutralizing the acidity of said gum.

6. A method of treating adhesive gums containing principally manno-galactans which comprises adding to the substantially dry gum a water-methyl alcohol solution of peracetic acid, heating the mixture so obtained to a temperature substantially above room temperature and below the boiling point of water, whereby the viscosity of said gum is reduced and the product is a substantially dry material, and adding thereto an inorganic, non-oxidizing, alkaline reacting salt for neutralizing the acidity of said gum.

7. A method of treating adhesive gums containing principally manno-galactans which comprises adding to the substantially dry gum peracetic acid, heating the mixture so obtained to a temperature substantially above room temperature and below the boiling point of water, whereby the viscosity of said gum is reduced and the product is a substantially dry material, and adding thereto a substance taken from the class consisting of glyoxal and formaldehyde in the liquid state.

8. A method of treating adhesive gums containing principally manno-galactans which comprises adding to the substantially dry gum peracetic acid, heating the mixture so obtained to a temperature substantially above room temperature and below the boiling point of water, whereby the viscosity of said gum is reduced and the product is a substantially dry material, and adding thereto a substance taken from the class consisting of glyoxal and formaldehyde in the liquid state in the amount of about .5% to 2.0%.

9. A method of treating adhesive gums containing principally manno-galactans which comprises adding to the substantially dry gum peracetic acid, heating the mixture so obtained to a temperature substantially above room temperature and below the boiling point of water, whereby the viscosity of said gum is reduced and the product is a substantially dry material, and adding thereto di-sodium phosphate for neutralizing the acidity of said gum.

10. A method of treating adhesive gums containing principally manno-galactans which comprises adding to the substantially dry gum peracetic acid, heating the mixture so obtained to a temperature substantially above room temperature and below the boiling point of water, whereby the viscosity of said gum is reduced and the product is a substantially dry material, and adding thereto alkali metal carbonate for neutralizing the acidity of said gum.

11. A method of treating adhesive gums containing principally manno-galactans which comprises adding to the substantially dry gum an aqueous solution of peracetic acid in amount of .25 to 10.0% by weight of said gum, heating the mixture so obtained to about 50° C. for about .5 to 3 hours, whereby a substantially dry product is obtained, adding thereto an inorganic, non-oxidizing, alkaline reacting salt for neutralizing the acidity of said product.

12. A method of treating adhesive gums containing principally manno-galactans which comprises adding to the substantially dry gum an aqueous solution of peracetic acid in amount of .25–10% by weight of said gum, heating the mixture so obtained to about 50° C. for about .5 to 3 hours, adding thereto an inorganic, non-oxidizing, alkaline reacting salt for neutralizing the acidity of said gum, and adding thereto about .5 to 2.0% of a substance taken from the class consisting of glyoxal and formaldehyde in the liquid state.

13. A method of treating adhesive gums containing principally manno-galactans which comprises adding to the substantially dry gum a 40% aqueous solution of peracetic acid in amount about 0.5 to 10% by weight of said gum, and heating the mixture so obtained to about 50° C. for about one-half hour, whereby a substantially dry product is obtained, adding thereto an inorganic, non-oxidizing, alkaline reacting salt for neutralizing the acidity of said product.

14. A method of treating adhesive gums containing principally manno-galactans which comprises adding to the substantially dry gum a 40% aqueous solution of peracetic acid in amount about 0.5 to 10% by weight of said gum, and heating the mixture so obtained to about 50° C., for about one-half hour, and adding thereto about 1% of glyoxal, adding thereto an inorganic, non-oxidizing, alkaline reacting salt for neutralizing the acidity of said gum.

15. A method of treating adhesive gums containing principally manno-galactans which comprises adding to the substantially dry gum peracetic acid and heating the mixture so obtained to a temperature substantially above room temperature and below the boiling point of water, whereby the viscosity of said gum, adding thereto an inorganic, non-oxidizing, alkaline reacting salt for neutralizing the acidity of said gum, is reduced and the product is a substantially dry material, and adding magnesium metaborate thereto.

16. A method of treating adhesive gums containing principally manno-galactans which comprises adding to the substantially dry gum peracetic acid and heating the mixture so obtained to a temperature substantially above room temperature and below the boiling point of water for a sufficient time to reduce the viscosity of said gum, adding thereto a substance for neutralizing the acidity of said gum, and adding magnesium metaborate thereto in an amount about 1 to 5% by weight of said gum.

17. A method of treating adhesive gums containing principally manno-galactans which comprises adding to the substantially dry gum peracetic acid and heating the mixture so obtained to a tempearture substantially above room temperature and below the boiling point of water for a sufficient time to reduce the viscosity of said gum to a viscosity equal to about 2 cps. in a 0.5% solution in water, whereby a substantially dry product is obtained, adding thereto an inorganic, non-oxidizing, alkaline reacting salt for neutralizing the acidity of said product.

References Cited in the file of this patent

UNITED STATES PATENTS

| 2,644,764 | Frisch | July 7, 1953 |

FOREIGN PATENTS

| 892,531 | France | Apr. 11, 1944 |
| 145,524 | Australia | May 11, 1936 |